United States Patent [19]
Koga et al.

[11] Patent Number: 4,633,511
[45] Date of Patent: Dec. 30, 1986

[54] SIGNAL TRANSMISSION AND RECEPTION SYSTEM

[75] Inventors: Daisuke Koga; Masahide Tamura; Yukio Naito, all of Kanagawa, Japan

[73] Assignee: Toyo Communication Equipment Co., Samukawa, Japan

[21] Appl. No.: 643,834

[22] Filed: Aug. 23, 1984

[30] Foreign Application Priority Data

Aug. 24, 1983 [JP] Japan ............................. 58-155327
Jul. 28, 1984 [JP] Japan ............................. 59-158485

[51] Int. Cl.⁴ ............................................. H04B 1/40
[52] U.S. Cl. ........................................ 455/86; 455/76; 370/30
[58] Field of Search ............... 455/86, 87, 84, 76, 455/112; 370/24, 30

[56] References Cited
U.S. PATENT DOCUMENTS 4,186,344 1/1980 Higuchi et al. ..................... 455/86
4,520,747 5/1985 Vilmur ................................ 455/87

Primary Examiner—Jin F. Ng
Assistant Examiner—E. Seidenglanz
Attorney, Agent, or Firm—Spensley, Horn, Jubas & Lubitz

[57] ABSTRACT

A duplex transmission and reception system wherein a local oscillator of the receiver is dispensed with by using the output of a modulated transmission oscillator, with its modulation cancelled, in lieu of a receiver local oscillator. The transmitter modulation signal is adjusted by appropriate level correction and phase inversion. The modulated output of the transmission oscillator is itself applied to a modulator, where it is modulated by the adjusted modulation signal. This results in substantially cancelling out the modulation component of the transmission oscillator output. This modulation-cancelled signal is supplied to the mixer of a superheterodyne receiver as a local oscillator signal.

2 Claims, 5 Drawing Figures

SIGNAL TRANSMISSION AND RECEPTION SYSTEM

BACKGROUND OF THE INVENTION

1. Field of the Invention

The present invention relates to the field of signal transmission and reception systems using a receiver which employs the superheterodyne system, and in particular, to systems which are adapted to share the radio frequency portion by using the transmission oscillator of the transmitter as the local oscillator of the receiver.

2. Description of the Prior Art

Conventional communication systems, typically radio or wireless telephones, of the duplex transmission system having a receiver of the superheterodyne system are designed such that the output of the transmission oscillator (channel oscillator) is modulated by an aural signal, etc., the oscillator output thus modulated is transmitted from an antenna at a transmission frequency fT through an amplifier and an antenna duplexer, a receiving signal of the frequency fR fed to a receiver through the antenna and the antenna duplexer is mixed at a mixer, with a signal fT generated by a local oscillator of the receiver, and an intermediate frequency fI which is lower than the frequency fR of the receiving signal is extracted through an intermediate frequency filter and picked up as an aural signal by a frequency discriminator.

In this case, to simplify the construction of the antenna duplexer, the system is usually designed so as to satisfy $|fT-fR|=fI$. In such design, since the oscillation frequency of the local oscillator is the same fT with that of the transmission oscillator, a single oscillator may be shared for both the local and the transmission oscillators, whereby cost is reduced.

However, the above method involves a problem that when a single oscillator is used for the above two oscillators, the transmission signal modulated by the aural signal, etc. is directly demodulated by the receiver so that it can be unfavorably heard as a side tone.

Solutions to the above problem are disclosed in U.S. patent application No. 337,609 filed Jan. 7, 1982 and Japanese patent application No. 54-68469. However, since the system of the U.S. patent application is designed to cancel the transmitter input contained in the demodulation signal by the addition or subtraction of the transmitter input after the demodulation of the receiving signal, addition/subtraction control is complex. On the other hand, the system of the Japanese Patent Application has a drawback that since the construction is such that the output of a first oscillator modulated by a modulation signal and the output of a second oscillator are mixed and the mixed output is fed to a second mixer, the modulation signal component cannot be removed sufficiently.

SUMMARY OF THE INVENTION

The present invention is directed to provide a solution to the aforementioned problems in communication equipment of the duplex transmission system and an object of the present invention is to provide a signal transmission and reception system having an oscillator used in common for the local oscillator of the receiver and the oscillator of the transmitter wherein the modulated output of the transmission oscillator is used as the local oscillator output of the receiver. In the case that the receiver is the double or more superheterodyne system, by providing the aforementioned modulation signal which has provided required phase shift to a second local oscillator or local oscillator subsequent thereto the modulation signal component contained in a first mixer output is cancelled at the intermediate frequency conversion stage, or the modulation signal component contained in the modulated output of the above oscillator is canceled by the modulation signal which has been phase inverted before the input to the first mixer of the receiver.

That is, in the first aspect of the present invention the system comprises means for supplying the transmission oscillator output of the transmitter which has been modulated by the modulation signal to the first mixer of the superheterodyne receiver as the first local oscillator output, and means for modulating the output of the second or subsequent local oscillators by the modulation signal level adjusted and phase shifted to required values respectively, whereby the first local oscillator of the transmitter is dispensed with, and wherein construction being made so that the modulation signal component mixed at the first mixer is canceled at the second or subsequent mixer to which the output of the second or subsequent local oscillator is fed.

The system of the second embodiment of the present invention comprises modulation means for modulating the output of the transmission oscillator by the modulation signal level adjusted to a required value and phase inverted to cancel the modulation signal component. The local oscillator of the receiver is dispensed with by supplying the output of the above modulation means to the mixer as the local oscillator output of the superheterodyne receiver.

According to the present invention, since a costly high-stability high-frequency oscillator can be dispensed with, remarkable effect in terms of cost reduction of the equipment employing the signal transmission and reception system of the present invention can be obtained.

DETAILED DESCRIPTION OF THE PREFERRED EMBODIMENT

Figure 1:
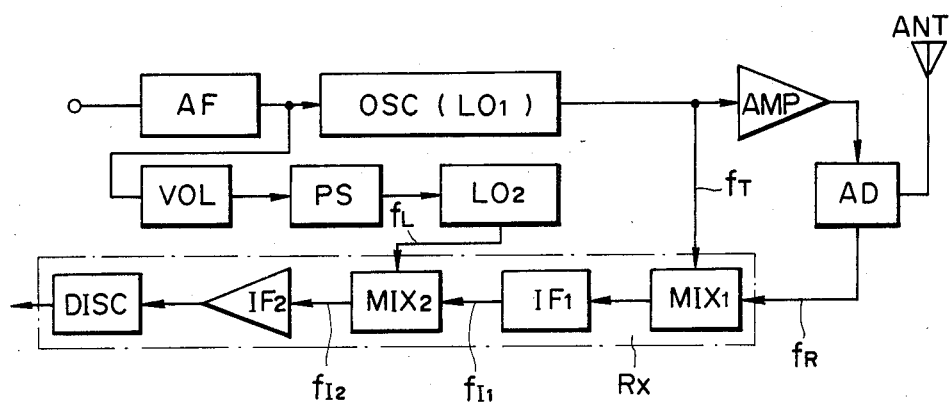
FIG. 1 is a block diagram of an embodiment of the signal transmission and reception system of the present invention.
Figure 2:
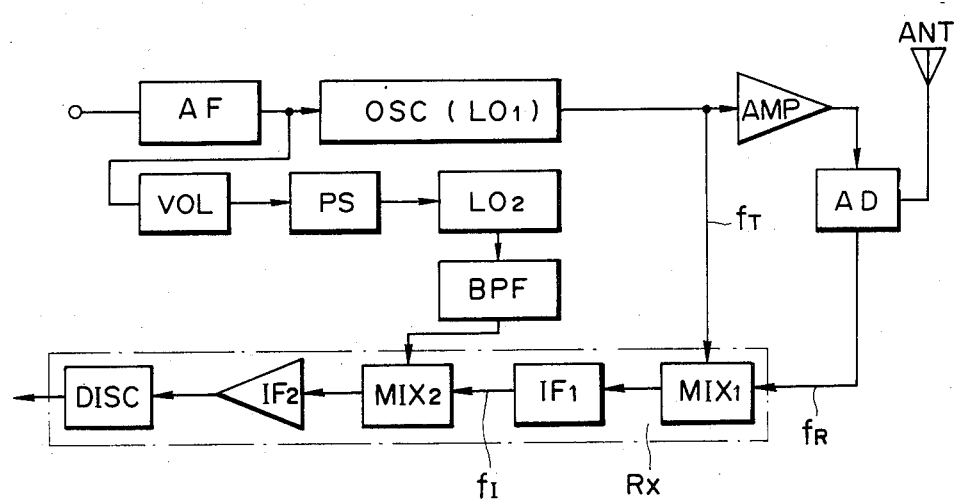
FIG. 2 is a block diagram of a modification of the embodiment of FIG. 1.
Figure 3:
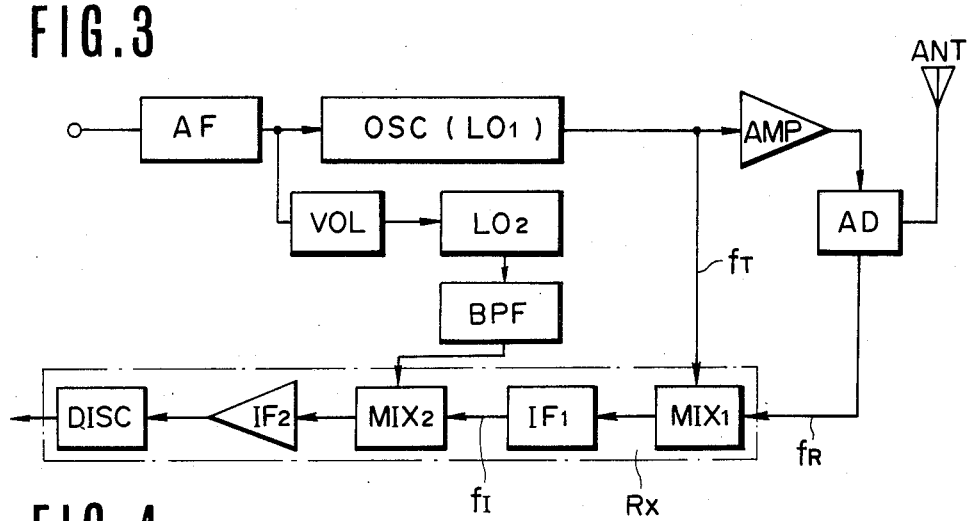
FIG. 3 is a block diagram of a further modification of the embodiment of FIG. 1.

FIG. 1 is a block diagram of an embodiment of the signal transmission and reception system according to the present invention, in which a receiver RX of the double superheterodyne system comprises a first mixer MIX1, a first intermediate frequency filter IF1, a second mixer MIX2, a second intermediate frequency filter 1F2, and a frequency discriminator DISC.

The output of a transmission oscillator (channel oscillator) OSC modulated by an output signal of an aural signal circuit AF is transmitted from an antenna ANT through an amplifier AMP and an antenna duplexer AD. The output of the transmission oscillator OSC is fed to the first mixer MIX1 of the receiver. That is, in this embodiment, the transmission oscillator OSC is used as a first local oscillator LO1 of the receiver RX. A receiving signal received at the antenna ANT is fed to the first mixer MIX1 of the receiver RX via the antenna duplexer AD as a received input signal fR. The first mixer MIX1 mixes the received input signal fR with a modulated output signal fT from the transmission oscillator OSC. A signal fI is extracted by directing the mixer output through the first intermediate frequency filter IF1, and is fed to the second mixer MIX2.

On the other hand, the modulated signal is adjusted at a level adjusting circuit VOL and a phase shifter PS so that its level and phase become the same modulation factor as the modulated signal component of the output fI of the first intermediate frequency filter IF1 and the same phase as the modulated phase of the output fI, and the output of a second local oscillator L02 is modulated by the output thereof.

Then, the output of the second local oscillator LO2 modulated as described above and the signal fI are fed to the second mixer MIX2, and are mixed. The output of the mixer MIX2 is fed to the frequency discriminator DISC via an amplifier IF2 including a second intermediate frequency filter.

With each operation being designed as given above, the modulation signal (output of the aural signal circuit AF) component mixed at the first mixer MIX1 is canceled at the second mixer MIX2.

For example, if the signal to be output from the aural signal circuit AF is made $\cos\omega_3 t$ for ..., and the FM system is employed at the transmission oscillator OSC, the modulated signal component in the output of the first intermediate frequency filter IF1 of the receiver RX can be expressed as follows.

$$fT(t) = \cos(\omega_1 + a\cos\omega_3 + \psi_1)t$$

where $\omega_1$ is the first intermediate frequency angular frequency (oscillation angular frequency of the transmission oscillator OSC at the time of non-modulation), $\psi_1$ is delayed phase due to the first intermediate frequency filter IF1, and a is the modulation factor at the transmission oscillator OSC. The modulated output fL(t) to be output from the second local oscillator LO2 can be given by $$fL(t) = \cos(\omega_2 + b\cos\omega_3 + \psi_2)t$$

where $\omega_2$ is the oscillation angular frequency of the second local oscillator L02 at the time of non-modulation, $\psi_2$ is the delayed phase due to the phase shifter PS, and b is the modulation factor at the second local oscillator LO2.

Here, the amount of phase shift of the phase shifter PS is set so as to become $\psi_2 = \psi_1$, and the modulation factor at the second local oscillator LO2 is set so as to become $b = a$. Now, setting that $\psi_2 = \psi_1 = \psi$, and $b = a$, the modulated signal component fT2 in the output of the second mixer MIX2 is calculated as follows.

$$\begin{aligned} fT2 &= fI(t) \cdot fL(t) \\ &= \cos(\omega_1 + 2\cos\omega_3 + \psi)t \cdot \cos(\omega_2 + a\cos\omega_3 + \psi)t \\ &= \tfrac{1}{2}\cos(\omega_1 + \omega_2 + 2a\cos\omega_3 + 2\psi)t + \tfrac{1}{2}\cos(\omega_1 - \omega_2)t \end{aligned}$$

In the above expression, the component of $\omega_3$ is not contained in the second term of the right side. By setting the pass band of the second intermediate frequency filter IF2 so as to contain the $(\omega_1 - \omega_2)$ component, a signal having been rid of the component of the modulated wave $\omega_2$ can be obtained from the second intermediate frequency filter IF2.

In the above embodiment, while the extension of the spectrum of the signal containing the modulated component to be fed to the second mixer MIX2 of the receiver RX through the first intermediate frequency filter IF1 is limited by the first intermediate frequency filter IF1, the spectrum of the signal to be output from the second local oscillator LO2 is only limited by a splatter filter of the aural signal circuit AF. Accordingly, the spectra of the above signals differ somewhat.

Therefore, it may be designed that the modulated output from the second local oscillator LO2 is fed to the second mixer MIX2 of the receiver RX via a band pass filter BPF. In this case, the central frequency of the band pass filter BPF is set to correspond with the center frequency of the second local oscillator LO2, and the pass band is set to correspond with that of the first intermediate frequency filter IF1 of the receiver RX. Then, the spectrum of the modulation signal component of the signal to be fed from the second local oscillator LO2 to the second mixer MIX2 and the spectrum of the modulation signal component of the signal to be fed from the first intermediate filter IF1 to the second mixer MIX2 can be made identical substantially, and thereby the modulation signal component can be cancelled efficiently.

In the above embodiment, using an inexpensive voltage controlled crystal oscillator VCXO as the second local oscillator LO2 will be convenient.

In addition, it is apparent that when the channel OSC is of the phase modulation system, the second local oscillator LO2 should also be of the phase modulation system.

In addition, though the above embodiment has been described using the double superheterodyne receiver, the system of the present invention is also applicable to a receiver comprising many intermediate frequency stages. In such case, it is satisfactory that the modulation signal component contained in the output signals of the intermediate frequency stages subsequent to the first intermediate frequency stage is cancelled using the modulated output signals of the local oscillators subsequent to the second local oscillators.

Figure 4:
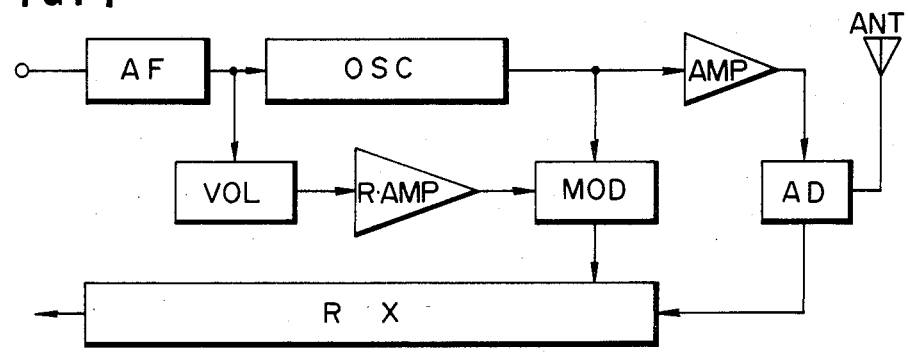
FIG. 4 is a block diagram of another embodiment of the signal transmission and reception system of the present invention.

FIG. 4 is a block diagram of other embodiment of the communication system according to the present invention. While all of the aforementioned embodiments use a signal containing the modulated signal component as an input signal to the first mixer of the receiver, this embodiment is characterized by removing the modulated signal component in advance from the signal to be fed to the first mixer.

That is, the modulated output signal, namely the output of the transmission oscillator OSC, is fed to a modulator MOD.

On the other hand, the level of the modulation signal is adjusted at a level adjusting circuit VOL, the modulation factor of the modulator MOD is made equal to the modulation factor of the modulated signal of the oscillator OSC output, the phase is inverted through a reverse amplifier R.AMP, and the output thereof is fed to the modulator MOD.

Since the modulation signal component contained in the output of the channel OSC is canceled by the phase inverted modulation signal in the modulator MOD, it is satisfactory that the carrier, namely the output thereof, is fed to the first mixer of the receiver RX.

In this case, since the phase difference between the modulated input signal for the oscillator OSC and the modulated output signal for the modulator MOD is very small and can be neglected virtually, no phase shifter is required, thereby contributing to the circuit simplification.

It is apparent that a phase shifter having the equivalent function may be used in lieu of the reverse amplifier R.AMP.

Figure 5:
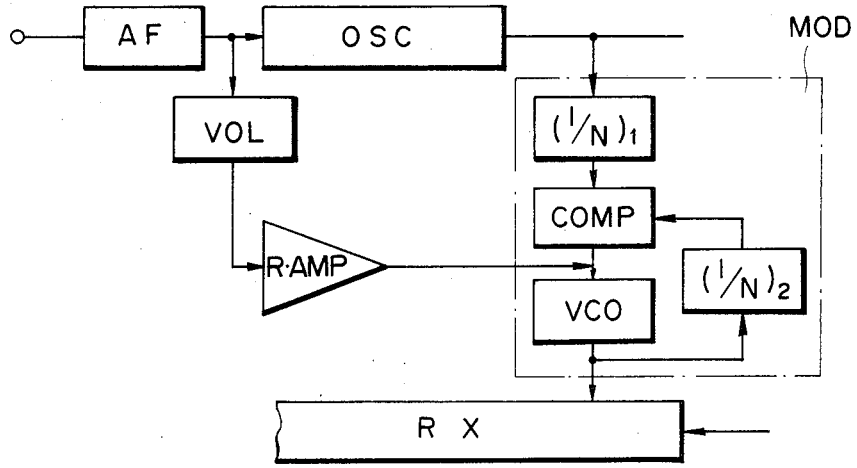
FIG. 5 is a detailed block diagram illustrating main parts of the embodiment of FIG. 4.

In addition, it is preferable that the reverse amplifier R.AMP is configured as shown in FIG. 5.

That is, the output of the oscillator OSC made to a suitable frequency at a first divider (1/N) is fed to a phase comparator COMP as a reference signal of the closed loop phase lock system comprised of a voltage controlled oscillator VCO, a second divider (1/N)2, and the phase comparator COMP, the modulation signal component contained in the output of the first divider (1/N)1 is canceled by the modulation signal having been level-adjusted at a level adjusting circuit VOL and phase-inverted at a reversing amplifier R.AMP, and a carrier having been rid of the modulation signal component is obtained by the output of the voltage controlled oscillator VCO.

Now, when the modulator of the channel oscillator OSC is of the frequency modulation system and the modulation signal circuit AF comprises a pre-emphasis circuit, since the modulated signal, namely the output of the channel oscillator OSC, is phase-modulated, the modulator MOD must be a frequency modulator. On the other hand, when the modulator of the oscillator OSC is of the phase modulation system, the modulator MOD should also be a phase modulator, since the modulation signal circuit AF has no pre-emphasis circuit, however, it is apparent that the modulator MOD should be a frequency modulator having a pre-emphasis circuit.

Though in the embodiments having been described, solely the method for removing the side tone of the receiver output has been described, some users demand the transmission of a low level side tone.

Such demand can be met by adjusting so as to break the balance of cancellation by changing one or more of the level, phase, and modulation factor of the modulated signal component.

What is claimed is:

1. In a signal transmission and reception system of the type having a receiver of the superheterodyne type and having a transmitter including a transmission oscillator which is modulated by a modulation signal, the improvement comprising:

adjusting means for level adjusting and phase inverting said modulation signal;

means for modulating an output of said modulated transmission oscillator by the modulation signal level adjusted to a required value and phase inverted by said adjusting means to cancel the modulation signal component of said output of said transmission oscillator, and wherein;

a mixer in said receiver, said mixer being supplied with the output of said means for modulating as a local oscillator signal.

2. In a duplex communication transceiver of the type having a superheterodyne receiver and having a transmitter that includes a transmission oscillator that is modulated by a modulation signal, the improvement comprising:

modulation signal adjustment means, connected to receive said transmitter modulation signal, for adjusting the signal level and for inverting the phase of said modulation signal, a modulator connected to said transmission oscillator to receive the modulated output thereof, said modulated oscillator output itself being modulated in said modulator by the output of said adjustment means, thereby substantially to cancel out the modulation component at the output of said transmission oscillator, said superheterodyne receiver having a mixer, the output of said modulator being supplied to said mixer as a local oscillator signal therefor.

* * * * *